(12) United States Patent
Kakimoto

(10) Patent No.: US 7,940,474 B2
(45) Date of Patent: May 10, 2011

(54) COMPACT ZOOM LENS

(75) Inventor: Tsuyoshi Kakimoto, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/535,864

(22) Filed: Aug. 5, 2009

(65) Prior Publication Data

US 2010/0033842 A1 Feb. 11, 2010

(30) Foreign Application Priority Data

Aug. 6, 2008 (KR) .................. 10-2008-0077061

(51) Int. Cl.
*G02B 15/14* (2006.01)
(52) U.S. Cl. .................. 359/689; 359/676; 359/680
(58) Field of Classification Search .................. 359/676, 359/680–682, 686, 689
See application file for complete search history.

(56) References Cited

U.S. PATENT DOCUMENTS

| 7,289,275 B2 * | 10/2007 | Ito | 359/689 |
| 2008/0180810 A1 * | 7/2008 | Ito | 359/689 |
| 2008/0304163 A1 * | 12/2008 | Katakura | 359/684 |

FOREIGN PATENT DOCUMENTS

| JP | 2005-084597 A | 3/2005 |
| JP | 2006-011096 A | 1/2006 |
| JP | 2007-272216 A | 10/2007 |

\* cited by examiner

*Primary Examiner* — Darryl J Collins
(74) *Attorney, Agent, or Firm* — Drinker Biddle & Reath LLP

(57) ABSTRACT

A three-lens group zoom lens in an N-P-P configuration; the first, second, and third lens groups are arranged sequentially from an object side to an image side; during zooming from a wide-angle to a telephoto position the distance between the first lens group and the second lens group is reduced and the distance between the second lens group and the third lens group is changed, and the zoom lens satisfies the following inequalities $$-1.3 < f_1/f_2 < -1.0$$

$$1.6 < f_2/f_w < 2.3$$

$$4.5 < f_3/f_w < 5.2,$$

where, $f_1$, $f_2$, and $f_3$, respectively, denote the focal lengths of the first, second and third lens groups, and $f_w$ denotes the focal length of the overall zoom lens at the wide-angle position.

10 Claims, 6 Drawing Sheets

COMPACT ZOOM LENS

CROSS-REFERENCE TO RELATED PATENT APPLICATIONS

This application claims the benefit of Korean Patent Application No. 10-2008-0077061, filed on Aug. 6, 2008, in the Korean Intellectual Property Office, the disclosure of which is incorporated herein in its entirety by reference.

BACKGROUND OF THE INVENTION

1. Field of the Invention

The present invention relates to a zoom lens having a small and compact size, wide viewing angle, and high magnification, and is thereby being suitable for use in various types of cameras.

2. Description of the Related Art

Recently, optical imaging apparatuses such as digital cameras or digital camcorders that use an image sensing device such as a charge coupled device (CCD) or a complementary metal-oxide semiconductor (CMOS) are widely used. In addition, since the demand for high functional optical imaging apparatuses having high magnification and wide viewing angle, low manufacturing costs, and small and lightweight structures has increased, the demand has similarly increased for zoom lenses for use in such optical focusing apparatuses which have high performance, low manufacturing cost, and lightweight structures.

In general, a three-group zoom lens has an appropriate zooming function and a relatively small size, and thus it can be easily used in compact and stylish digital cameras.

While three-group zoom lenses of various designs have been suggested, it is difficult to realize aberration correction and small zoom optics simultaneously. For example, if the focal length of the first lens group is set to be short in order to reduce the size of the zoom lens, the thickness of the zoom lens increases in order to correct the aberration, and thus, the overall length of the zoom lens also increases when the zoom lens is in standby status. In addition, when the first lens group has many aspherical surfaces, it becomes expensive to fabricate.

SUMMARY OF THE INVENTION

The present invention provides a zoom lens having small size, wide viewing angle, and high magnification.

According to an aspect of the present invention, there is provided a zoom lens including: a first lens group having a negative refractive power; a second lens group having a positive refractive power; and a third lens group having a positive refractive power, wherein the first, second, and third lens groups may be arranged sequentially from an object side to an image side, and the lens groups are moved during zooming from a wide-angle position to a telephoto position so that the distance between the first lens group and the second lens group can be reduced and the distance between the second lens group and the third lens group can be changed, and the zoom lens satisfies the following inequalities $$-1.3 < f_1/f_2 < -1.0$$

$$1.6 < f_2/f_w < 2.3$$

$$4.5 < f_3/f_w < 5.2,$$

where, $f_1$, $f_2$, $f_3$ and $f_w$ respectively denote the focal length of the first lens group, the focal length of the second lens group, the focal length of the third lens group, and the overall focal length of the zoom lens at the wide-angle position.

The first lens group may include a meniscus lens that is convex toward the object side and has a negative refractive power, and another lens having a positive refractive power. The zoom lens may satisfy the following inequality $$-2.2 < f_{12}/f_{11} \times \tan(\omega w) < -1.9,$$

where $f_{11}$, $f_{12}$, and $\omega$ w respectively denote the focal length of the negative lens in the first lens group, the focal length of the positive lens in the first lens group, and the half angle of view in the wide-angle position.

Both surfaces of the meniscus lens having a negative refractive power may be aspherical surfaces. The third lens group may include one positive lens, and the positive lens may include at least one aspherical surface.

The second lens group may include four lenses that are arranged sequentially from the object side to have positive refractive power, positive refractive power, negative refractive power, and positive refractive power, respectively. A first lens facing the object in the second lens group may have at least one aspherical surface.

The zoom lens may satisfy the following inequality $$1.0 < L_t/L_w < 1.2,$$

where $L_t$ and $L_w$ respectively denote the overall length of the zoom lens at the telephoto position and the wide-angle position.

According to another aspect of the present invention, there is provided a photographing apparatus including: a zoom lens according to an embodiment of the present invention; and a charge coupled device receiving an image formed by the zoom lens.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
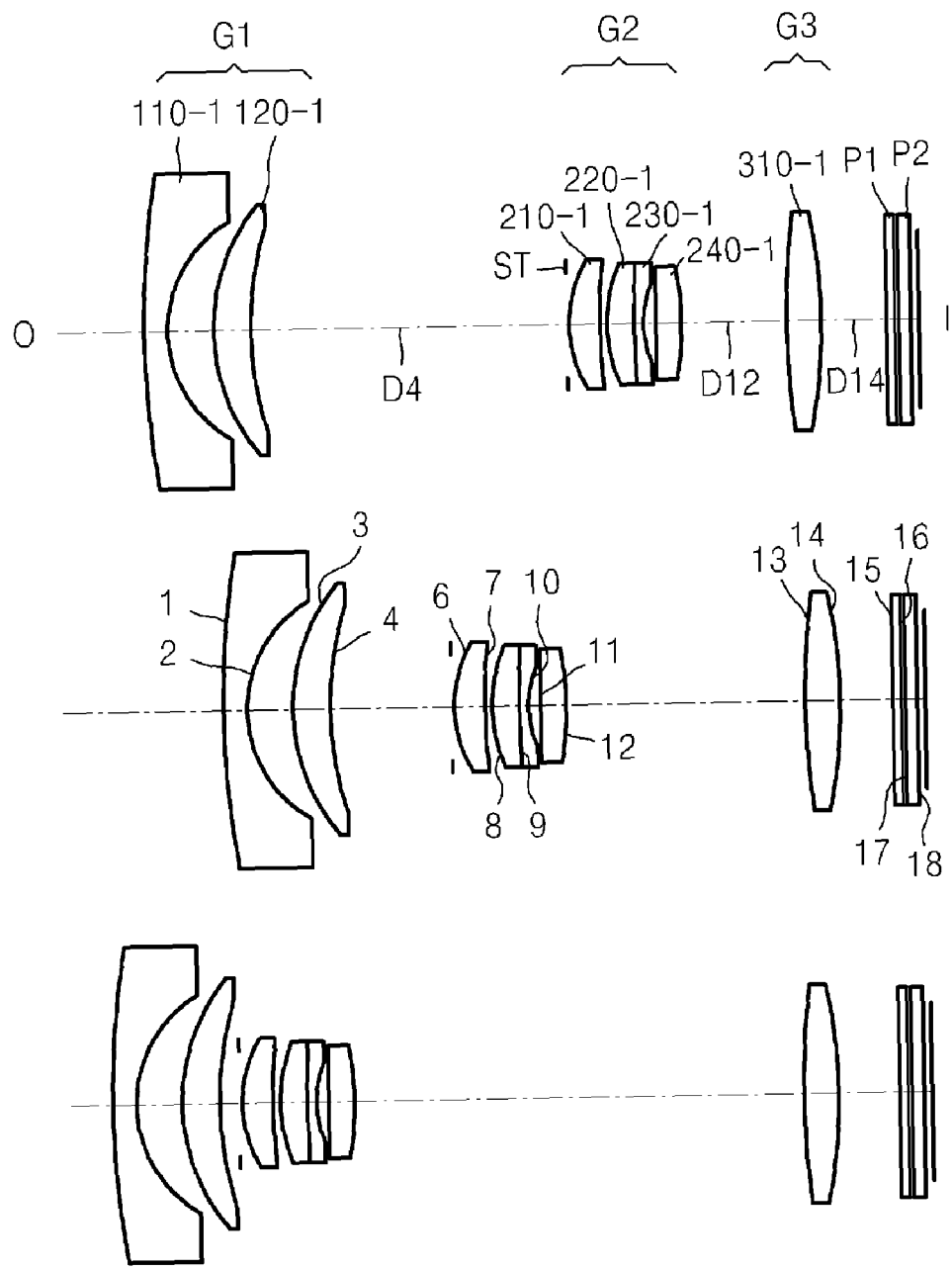
FIG. 1 is a diagram showing optical arrangements of a zoom lens at wide-angle position, middle-angle position, and telephoto position according to an embodiment of the present invention.

The present invention will now be described more fully with reference to the accompanying drawings, in which exemplary embodiments of the invention are shown. In the drawings, the thicknesses of layers and regions are exaggerated for clarity.

Figure 3:
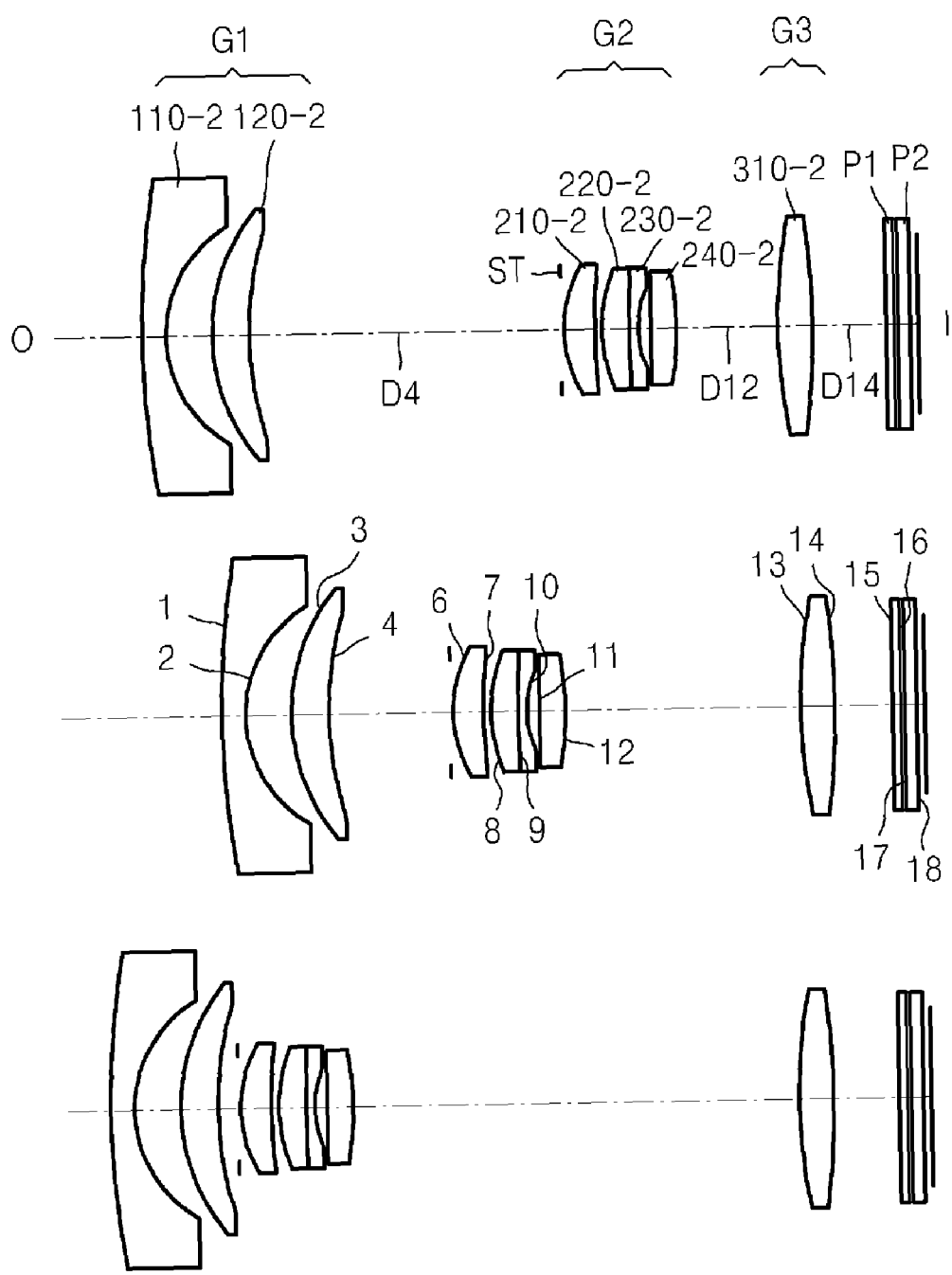
FIG. 3 is a diagram showing optical arrangements of a zoom lens at wide-angle position, middle-angle position and telephoto position according to another embodiment of the present invention.
Figure 5:
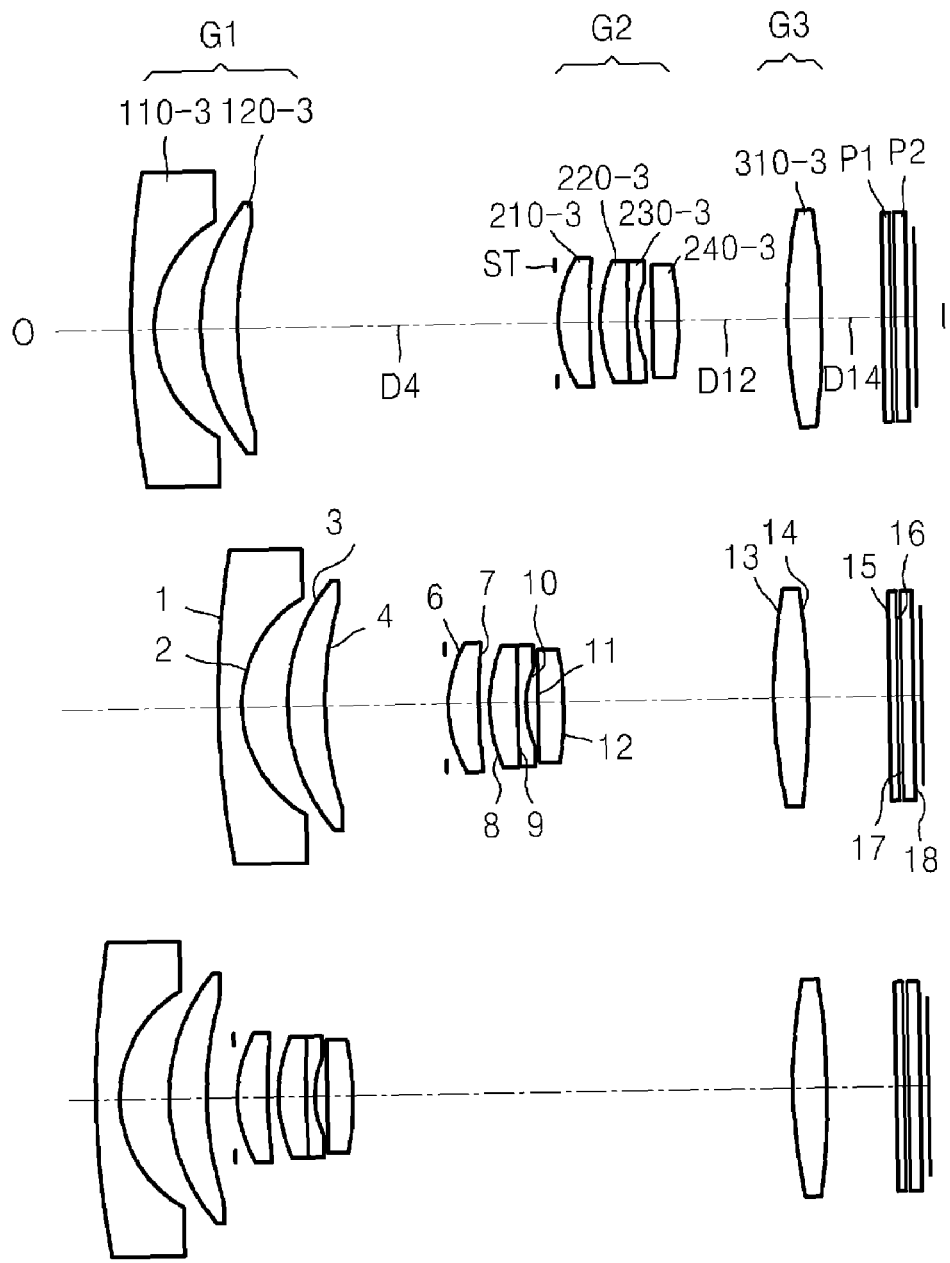
FIG. 5 is a diagram showing optical arrangements of a zoom lens at wide-angle position, middle-angle position and telephoto position according to another embodiment of the present invention.

FIGS. 1, 3, and 5 are diagrams showing optical arrangements of a zoom lens at wide-angle, middle-angle and telephoto positions according to various embodiments of the present invention. Referring to FIGS. 1, 3 and 5, the zoom lens includes a first lens group G1 having a negative refractive power, a second lens group G2 having a positive refractive power, and a third lens group G3 having a positive refractive power, which are arranged sequentially from an object O side to an image I side. When zooming from wide-angle to telephoto positions, the first lens group G1 moves along a path convex toward the image I side, the second lens group G2 moves monotonously toward the object O, and the third lens group G3 moves such that the distance between the third lens group G3 and the second lens group G2 changes. That is, the lens groups move along an optical axis so that the distance between the first lens group G1 and the second lens group G2 is reduced and the distance between the second lens group G2 and the third lens group G3 is changed.

The zoom lens according to the present embodiment is configured so as to satisfy the following inequality.

$$-1.3 < f_1/f_2 < -1.0 \quad (1)$$

where $f_1$, $f_2$ respectively denote focal lengths of the first lens group G1 and the second lens group G2.

The above formula defines the ratio between the focal lengths of the first lens group G1 and the second lens group G2. When the ratio $f_1/f_2$ increases beyond the maximum limit, the focal length of the first lens group G1 is reduced, and thus, it is difficult to compensate the aberration, and in particular, the distortion, at various zoom positions. When the ratio $f_1/f_2$ decreases below the minimum limit, the movement of the first lens group G1 increases during zooming, and thus, the overall length of the zoom lens increases.

In addition, the zoom lens according to the embodiments of the present invention may satisfy the following inequality.

$$1.6 < f_2/f_w < 2.3 \quad (2)$$

where $f_2$ and $f_w$ respectively denote the focal length of the second lens group G2 and a focal length of the entire optics in the wide-angle position.

The above formula defines the ratio between the focal length of the second lens group G2 and the focal length of the overall zoom lens at the wide-angle position. When the ratio $f_2/f_w$ increases beyond the maximum limit, the moving distance of the second lens group G2 increases during zooming, and thus, the overall length of the zoom lens increases. In addition, when the ratio $f_2/f_w$ decreases below the minimum limit, the focal length of the second lens group G2 is reduced even though the overall length of the zoom lens is increases, and thus, it is difficult to compensate the aberration throughout the zooming range.

In addition, the zoom lens according to the embodiments of the present invention may satisfy the following inequality.

$$4.5 < f_3/f_w < 5.2 \quad (3)$$

where $f_3$ and $f_w$ respectively denote the focal length of the third lens group G3 and the focal length of the overall zoom lens at the wide-angle position.

The above inequality defines a ratio between the focal length of the third lens group G3 and the focal length of the overall zoom lens at the wide-angle position. When the ratio $f_3/f_w$ increases beyond the maximum limit, an exit pupil becomes close to the image surface, and thus a telecentric property degrades. In addition, when the ratio $f_3/f_w$ decreases below the minimum limit, the refractive power of the third lens group G3 becomes stronger, and thus, astigmatism increases although the telecentric property improves.

In addition, the zoom lens according to the embodiments of the present invention may satisfy the following inequality.

$$-2.2 < f_{12}/f_{11} \times \tan(\omega w) < -1.9 \quad (4)$$

where $f_{11}$, $f_{12}$, and $\omega$ w respectively denote the focal length of a negative lens in the first lens group G1, the focal length of a positive lens in the first lens group G1, and the half angle of view at the wide-angle position.

When the value $f_{12}/f_{11} \times \tan(\omega$ w$)$ increases beyond the maximum limit, it is difficult to obtain a focal length suitable at the wide angle position. In addition, when the value $f_{12}/f_{11} \times \tan(\omega$ w$)$ decreases below the minimum limit, the refractive power of the negative lens in the first lens group G1 becomes stronger, and it is difficult to compensate the aberration, in particular, the distortion, throughout the entire zoom range.

In addition, the zoom lens according to embodiments of the present invention may satisfy the following inequality.

$$1.0 < L_t/L_w < 1.2 \quad (5)$$

where $L_t$ and $L_w$ respectively denote the overall length of the zoom lens at the telephoto position and the overall length of the zoom lens at the wide-angle position.

When the ratio $L_t/L_w$ increases beyond the maximum limit, the overall length of the zoom lens at the telephoto position becomes relatively longer than that at the wide-angle position, and thus, the moving distance of the first lens group G1 and the second lens group G2 increase. As a result, the zoom lens must is enlarged in order to ensure the moving amount, and F number at the telephoto position increases. In addition, when the ratio $L_t/L_w$ decreases below the minimum limit, the aperture of the lens in the first lens group G1 increases, and thus, it is difficult to reduce the size of the zoom lens.

Configurations and operations of the zoom lens will be described as follows with reference to FIG. 1.

The first lens group G1 focuses a virtual image of an object, and moves non-linearly during zooming in order to compensate for the change in the focusing position of the overall zoom lens. The first lens group G1 may include a first lens 110-1 that is a negative meniscus lens formed to be convex toward the object side O, and a second lens 120-1 that is convex toward the object side O and has a positive refractive power. When the first lens group G1 is formed to include two lenses, the entire thickness of the first lens group G1 can be reduced and it is easy to assemble and adjust the lenses, and accordingly, the first lens group G1 can be fabricated at relatively low cost. In addition, when the lenses for the first lens group G1 having negative refractive power and positive refractive power are sequentially arranged from the object side O, coma aberration and distortion at the wide-angle position and spherical aberration at the telephoto position can be compensated for. In addition, both surfaces of the first lens 110-1, which is the negative meniscus lens, may be aspherical surfaces. Accordingly, the distortion at the wide-angle position can be compensated for, and the overall refractive power of the first lens group G1 becomes stronger, thus, providing a compact zoom lens.

The second lens group G2 moves monotonously to perform zooming of the virtual image generated by the first lens group G1. In general, the second lens group G2 in the three-group type zoom lens is a triplet lens including three lenses having positive, negative, and positive refractive power, respectively. However, the second lens group G2 of the present embodiment includes four lenses. The second lens group G2 may include, for example, a third lens 210-1 that is a positive lens, a doublet lens consisting of a fourth lens 220-1 that is a positive lens and a fifth lens 230-1 that is a negative lens, and a sixth lens 240-1 that is a positive lens. The second lens group G2 of the present embodiment has the above structure to address the following described disadvantages of the general triplet lens configuration.

When the second lens group is fabricated as a triplet structure and is disposed behind the first lens group which has negative refractive power, divergent light rays emitted from the first lens group are incident onto the second lens group, and thus, it is difficult to compensate for the spherical aberration. In addition, in order to improve compensation for negative distortion generated in the first lens group G1, the entire second lens group G2 should be arranged to have the refractive power of the telephoto type. In that case, strong refractive power is concentrated on the positive lens located on the outermost portion of the second lens group G2, which faces the object side, and thus, it is difficult to compensate for the spherical aberration. In order to compensate for the spherical aberration using the second lens group of the triplet structure, the entire refractive power of the second lens group is substantially weakened, and thus, the size of the zoom lens increases. Therefore, it is difficult to achieve both a compact size of zoom lens and high performance of the zoom lens when the second lens group has the triplet structure.

Therefore, the zoom lens according to the present embodiment includes the second lens group G2 that includes the third lens 210-1 that is a positive lens, the doublet lens consisting of the fourth lens 220-1 that is a positive lens and the fifth lens 230-1 that is a negative lens, and the sixth lens 240-1 that is a positive lens, which are arranged sequentially from the object side along the optical axis. As a result, compensating for the distortion or chromatic aberration of magnification is improved, and at the same time, the refractive power of the entire second lens group G2 can be strengthened and a more compact zoom lens can be fabricated.

In addition, at least one surface of the third lens 210-1, which is the first lens of the second lens group G2 from the object side, may be an aspherical surface. Then, the spherical aberration and the coma aberration generated in the second lens group G2 can be improved well, and the refractive power of the second lens group G2 can be increased. In addition, in order to ensure the above effects, a surface of the third lens 210-1 facing the object O may be an aspherical surface.

The third lens group G3 moves during zooming so that the exit pupil of the zoom lens can be located at a position where the light can be efficiently incident onto an imaging device, and at the same time, compensates for the aberration that cannot be compensated for by the first and second lens groups G1 and G2. The third lens group G3 may include a seventh lens 310-1 that is a positive lens. Since the third lens group G3 consists of one lens, the entire thickness of the third lens group G3 is relatively small, and it is easy and economical to assemble the third lens group. In addition, at least one surface of the seventh lens 310-1 may be an aspherical surface, and accordingly, the astigmatism that is not compensated for by the first and second lens groups G1 and G2 can be compensated for.

As described above, the zoom lens according to the embodiments of the present invention may satisfy the conditions given by inequalities 1 to 5. Inequalities 1 to 5 can be modified in inequalities 6 to 10 for performing the aberration compensation and for efficiently fabricating a relatively small zoom lens.

$$-1.2 < f_1/f_2 < -1.1 \tag{6}$$

$$1.8 < f_2/f_w < 2.1 \tag{7}$$

$$4.7 < f_3/f_w < 5.0 \tag{8}$$

$$-2.1 < f_{12}/f_{11} \times \tan(\omega w) < -2.05 \tag{9}$$

$$1.0 < L_t/L_w < 1.1 \tag{10}$$

Hereinafter, detailed lens data according to embodiments of the present invention will be described as follows. The aspherical surface can be defined as follows.

$$x = \frac{c'y^2}{1 + \sqrt{1 - (K+1)c'^2 y^2}} + Ay^4 + By^6 + Cy^8 + Dy^{10} \tag{11}$$

Here, x denotes the distance from the vertex of a lens on the optical axis direction, and y denotes the distance in a direction perpendicular to the optical axis direction. K denotes a conic constant and A, B, C, and D denote aspheric coefficients, and c' denotes a reciprocal of the radius of curvature, 1/R, at the vertex of the lens.

Hereinafter, f denotes the focal length of the overall zoom lens, FNo denotes the F number, 2ω denotes the angle of view, L denotes the overall length of the zoom lens, and ST denotes an aperture stop. Ri and Di respectively denote the radius of curvature of a surface i and a distance between the surface i and a surface (i+1). In addition, ni and vi respectively denote the refractive index of i-th member from the object side O based on a d-line, and Abbe's number. In each of the embodiments, a variable distance between the lenses is D4, D12, or D14. Reference numerals of components are attached with the numbers indicating the first to third embodiments.

First Embodiment

FIG. 1 shows a zoom lens according to an embodiment of the present invention. The first lens group G1 includes the first lens 110-1 and the second lens 120-1, the second lens group G2 includes the third, fourth, fifth, and sixth lenses 210-1, 220-1, 230-1, and 240-1, and the third lens group G3 includes the seventh lens 310-1. In addition, P1 and P2 denote an infrared ray filter and a cover glass.

| | | | |
|---|---|---|---|
| R1 = 22.351 | D1 = 1.10 | N1 = 1.85800 | v1 = 40.1 |
| R2 = 4.227 | D2 = 2.06 | | |
| R3 = 8.491 | D3 = 1.65 | N2 = 1.92286 | v2 = 20.9 |
| R4 = 17.696 | D4 = variable | | |
| R5 = ST | D5 = 0.00 | | |
| R6 = 5.464 | D6 = 1.39 | N3 = 1.76600 | v3 = 46.8 |
| R7 = 48.725 | D7 = 0.34 | | |
| R8 = 6.197 | D8 = 1.18 | N4 = 1.51742 | v4 = 52.2 |
| R9 = 31.379 | D9 = 0.45 | N5 = 1.92286 | v5 = 20.9 |
| R10 = 4.018 | D10 = 0.51 | | |
| R11 = 38.236 | D11 = 1.13 | N6 = 1.80518 | v6 = 25.5 |
| R12 = −15.812 | D12 = variable | | |
| R13 = 28.620 | D13 = 1.54 | N7 = 1.51470 | v7 = 63.8 |
| R14 = −21.925 | D14 = variable | | |
| R15 = ∞ | D15 = 0.30 | N8 = 1.51678 | v8 = 64.2 |
| R16 = ∞ | D16 = 0.30 | | |
| R17 = ∞ | D17 = 0.50 | N9 = 1.51678 | v9 = 64.2 |
| R18 = ∞ | | | |

| Deformation term |
|---|
| R1 surface |
| K = 0.00000E+00 |
| A = −6.65409E−04 |
| B = 2.19545E−05 |
| C = −3.66287E−07 |
| D = 2.36025E−09 |
| R2 surface |
| K = −4.63912E−01 |
| A = −1.06486E−03 |
| B = −1.36362E−05 |
| C = 1.46498E−06 |
| D = −5.67865E−08 |
| R6 surface |
| K = −1.00000E+00 |
| A = 3.48355E−04 |
| B = 0.00000E+00 |
| C = 0.00000E+00 |
| D = 0.00000E+00 |
| R14 surface |
| K = −3.53781E−01 |
| A = 7.32041E−05 |
| B = 1.44298E−05 |
| C = −1.14533E−06 |
| D = 2.56088E−08 |

|   | wide | middle | telephoto |
|---|---|---|---|
| F | 5.09 | 10.00 | 19.21 |
| F no | 2.84 | 4.00 | 6.04 |
| 2ω | 77.6 | 43.0 | 22.9 |
| L | 34.87 | 31.64 | 36.87 |

| Variable distance | | | |
|---|---|---|---|
| D4 | 14.24 | 5.69 | 1.00 |
| D12 | 4.67 | 10.73 | 20.21 |
| D14 | 3.14 | 2.40 | 2.80 |

Figure 2:
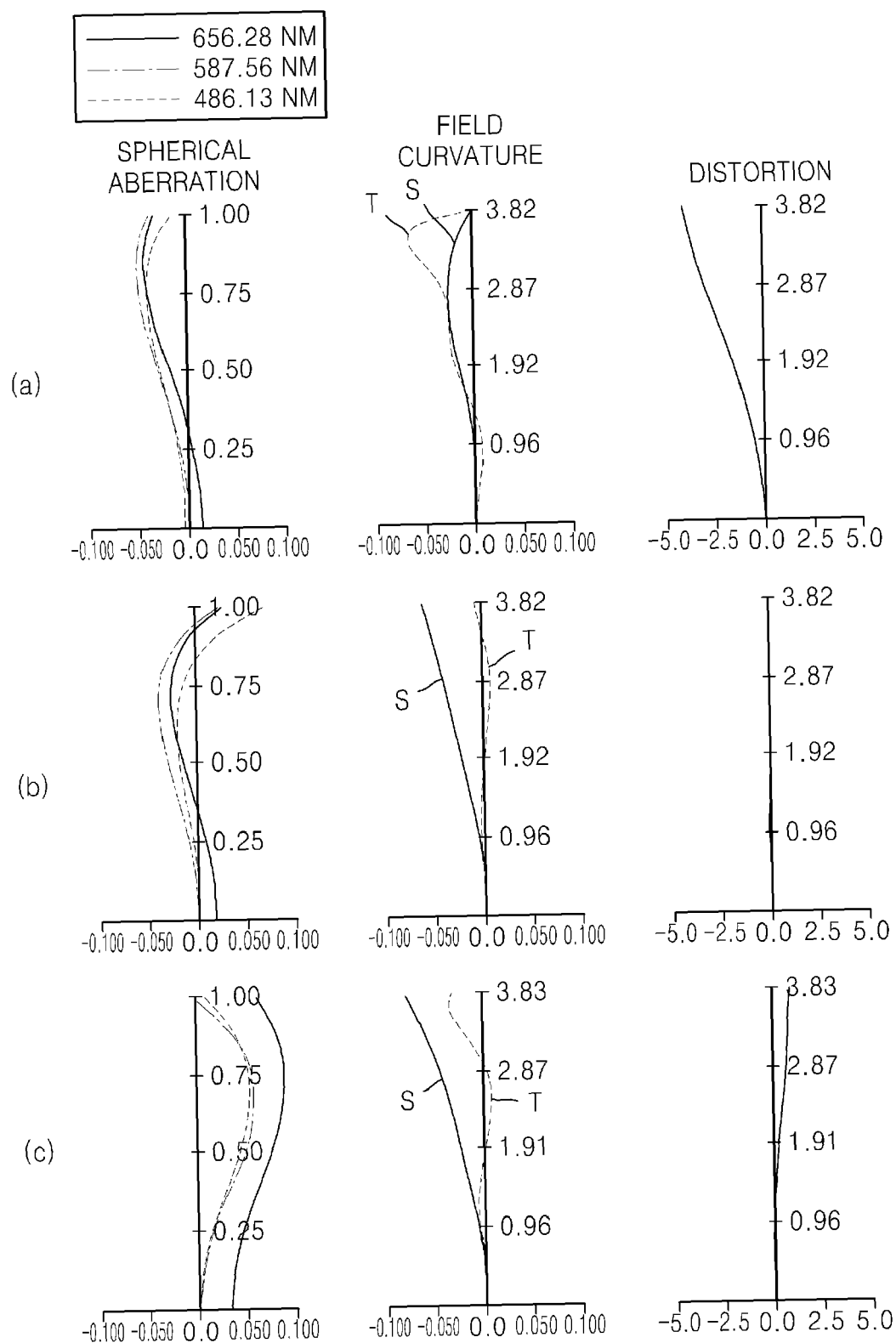
FIG. 2 shows diagrams of spherical aberration, field curvature, and distortion of the zoom lens at wide-angle position, middle-angle position and telephoto position according to the embodiment of the present invention.

FIG. 2 shows diagrams of longitudinal spherical aberration, an astigmatic field curvature, and distortion of the zoom lens according to the current embodiment of the present invention at (a) wide-angle position, (b) middle-angle position, and (c) telephoto position, respectively. The longitudinal spherical aberrations are with respect to a line c having a wavelength of 656.28 nm, a line d having a wavelength of 587.56 nm, and a line f having a wavelength of 486.13 nm. The field curvature includes a tangential field curvature (T) and a sagittal field curvature (S), which are respectively represented by a dotted line and a solid line.

Second Embodiment

FIG. 3 shows a zoom lens according to another embodiment of the present invention. The first lens group G1 includes the first and second lenses 110-2 and 120-2, the second lens group G2 includes the third, fourth, fifth, and sixth lenses 210-2, 220-2, 230-2, and 240-2, and the third lens group G3 includes the seventh lens 310-2. In addition, P1 and P2 denote an infrared ray filter and a cover glass.

| R1 = 24.088 | D1 = 1.10 | N1 = 1.85800 | ν1 = 40.1 |
|---|---|---|---|
| R2 = 4.286 | D2 = 2.03 | | |
| R3 = 8.416 | D3 = 1.67 | N2 = 1.92286 | ν2 = 20.9 |
| R4 = 17.647 | D4 = variable | | |
| R5 = ST | D5 = 0.00 | | |
| R6 = 5.566 | D6 = 1.38 | N3 = 1.76600 | ν3 = 46.8 |
| R7 = 58.838 | D7 = 0.35 | | |
| R8 = 6.236 | D8 = 1.19 | N4 = 1.51742 | ν4 = 52.2 |
| R9 = 34.448 | D9 = 0.45 | N5 = 1.92286 | ν5 = 20.9 |
| R10 = 4.092 | D10 = 0.52 | | |
| R11 = 71.173 | D11 = 1.12 | N6 = 1.80518 | ν6 = 25.5 |
| R12 = −13.958 | D12 = variable | | |
| R13 = 18.321 | D13 = 1.57 | N7 = 1.51678 | ν7 = 64.2 |
| R14 = −43.056 | D14 = variable | | |
| R15 = ∞ | D15 = 0.30 | N8 = 1.51678 | ν8 = 64.2 |
| R16 = ∞ | D16 = 0.30 | | |
| R17 = ∞ | D17 = 0.50 | N9 = 1.51678 | ν9 = 64.2 |
| R18 = ∞ | | | |

| Aspheric coefficients |
|---|
| R1 surface |
| K = 0.00000E+00 |
| A = −4.66680E−04 |
| B = 1.41568E−05 |
| C = −2.15957E−07 |
| D = 1.34781E−09 |
| R2 surface |
| K = −4.62184E−01 |
| A = −7.88756E−04 |
| B = −1.55754E−05 |
| C = 1.12464E−06 |
| D = −4.19529E−08 |
| R6 surface |
| K = −1.00000E+00 |
| A = 3.04490E−04 |
| B = 0.00000E+00 |
| C = 0.00000E+00 |
| D = 0.00000E+00 |

|   | Wide | middle | telephoto |
|---|---|---|---|
| f | 5.04 | 10.00 | 19.26 |
| F no | 2.82 | 3.98 | 6.03 |
| 2ω | 78.4 | 43.3 | 23.0 |
| L | 35.06 | 31.73 | 37.06 |

| Variable distances | | | |
|---|---|---|---|
| D4 | 14.48 | 5.67 | 0.98 |
| D12 | 4.52 | 10.70 | 20.42 |
| D14 | 3.22 | 2.51 | 2.81 |

Figure 4:
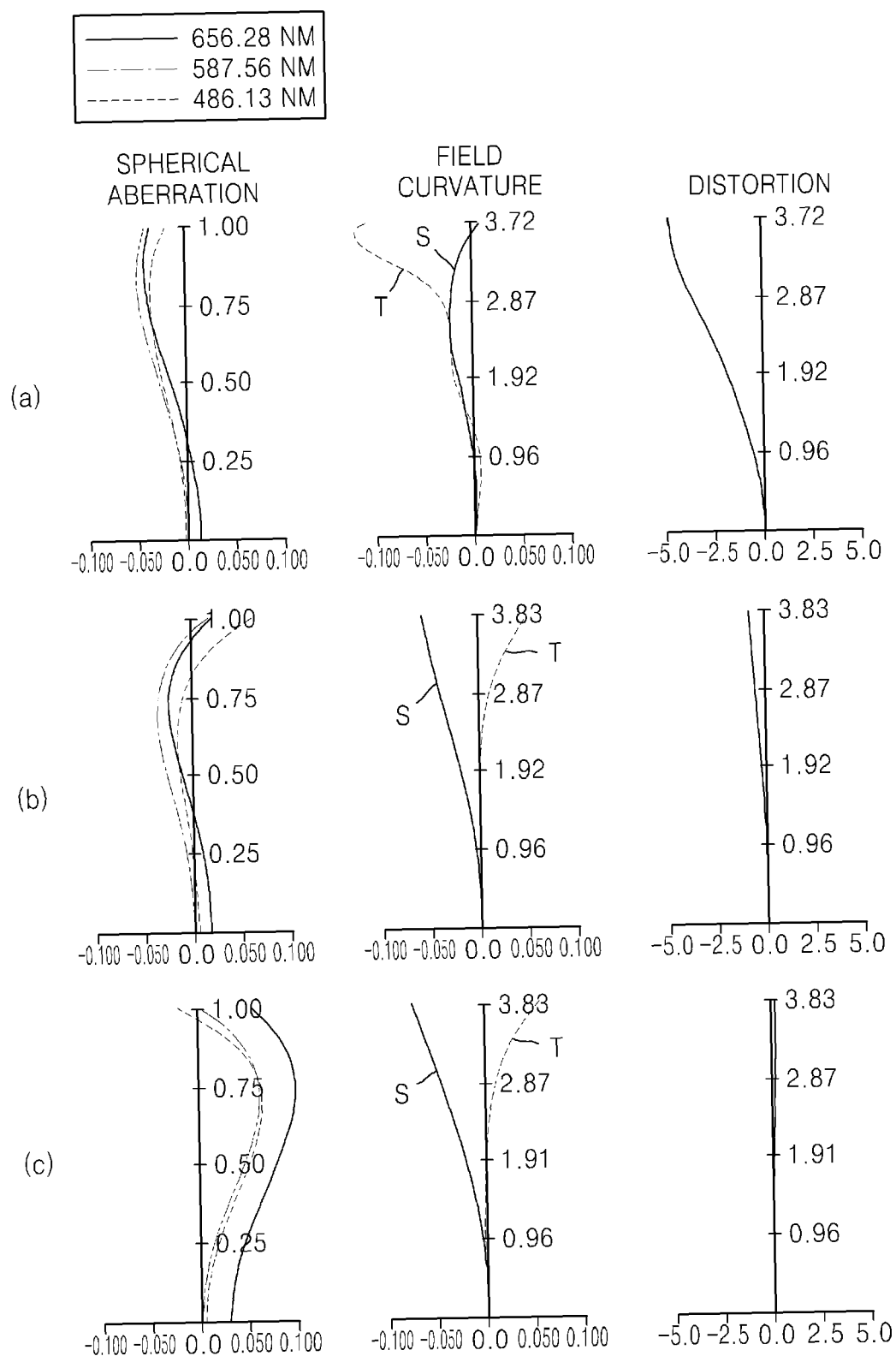
FIG. 4 shows diagrams of spherical aberration, field curvature, and distortion of the zoom lens at wide-angle position, middle-angle position and telephoto position according to another embodiment of the present invention.

FIG. 4 shows diagrams of longitudinal spherical aberration, astigmatic field curvature, and distortion of the zoom lens according to the current embodiment of the present invention at (a) wide-angle position, (b) middle-angle position, and (c) telephoto positions, respectively. The longitudinal spherical aberrations are with respect to a line c having a wavelength of 656.28 nm, a line d having a wavelength of 587.56 nm, and a line f having a wavelength of 486.13 nm. The field curvature includes a tangential field curvature (T)

and a sagittal field curvature (S), which are respectively represented by a dotted line and a solid line.

Third Embodiment

FIG. 5 shows a zoom lens according to another embodiment of the present invention. The first lens group G1 includes the first and second lenses 110-3 and 120-3, the second lens group G2 includes the third, fourth, fifth, and sixth lenses 210-3, 220-3, 230-3, and 240-3, and the third lens group G3 includes the seventh lens 310-3. In addition, P1 and P2 denote an infrared ray filter and a cover glass.

| | | | |
|---|---|---|---|
| R1 = 21.4172 | D1 = 1.1 | N1 = 1.85800 | v1 = 40.1 |
| R2 = 4.14907 | D2 = 2.02568 | | |
| R3 = 8.20443 | D3 = 1.64259 | N2 = 1.92286 | v2 = 20.9 |
| R4 = 15.99 | D4 = variable | | |
| R5 = ST | D5 = 0.00 | | |
| R6 = 5.2306 | D6 = 1.53654 | N3 = 1.76600 | v3 = 46.8 |
| R7 = −163.89 | D7 = 0.25622 | | |
| R8 = 7.16589 | D8 = 1.19205 | N4 = 1.51742 | v4 = 52.2 |
| R9 = 220.228 | D9 = 0.45 | N5 = 1.92286 | v5 = 20.9 |
| R10 = 3.8578 | D10 = 0.56808 | | |
| R11 = 18.4079 | D11 = 0.9971 | N6 = 1.92286 | v6 = 20.9 |
| R12 = −35.873 | D12 = variable | | |
| R13 = 16.2882 | D13 = 1.62219 | N7 = 1.48745 | v7 = 70.4 |
| R14 = −40.957 | D14 = variable | | |
| R15 = ∞ | D15 = 0.30 | N8 = 1.51678 | v8 = 64.2 |
| R16 = ∞ | D16 = 0.30 | | |
| R17 = ∞ | D17 = 0.50 | N9 = 1.51678 | v9 = 64.2 |
| R18 = ∞ | | | |

| Aspheric coefficients |
|---|
| R1 surface |
| K = 0.00000E+00 |
| A = −4.66680E−04 |
| B = 1.41568E−05 |
| C = −2.15957E−07 |
| D = 1.34781E−09 |
| R2 surface |
| K = −4.62184E−01 |
| A = −7.88756E−04 |
| B = −1.55754E−05 |
| C = 1.12464E−06 |
| D = −4.19529E−08 |
| R6 surface |
| K = −1.00000E+00 |
| A = 3.04490E−04 |
| B = 0.00000E+00 |
| C = 0.00000E+00 |
| D = 0.00000E+00 |

| | Wide | middle | telephoto |
|---|---|---|---|
| f | 5.04 | 9.58 | 18.30 |
| F no | 2.83 | 3.81 | 5.88 |
| 2ω | 75.9 | 44.6 | 24.2 |
| L | 33.00 | 29.44 | 34.86 |

| Variable distances | | | |
|---|---|---|---|
| D4 | 13.20 | 4.91 | 1.00 |
| D12 | 4.62 | 8.52 | 18.20 |
| D14 | 2.32 | 3.15 | 2.80 |

Figure 6:
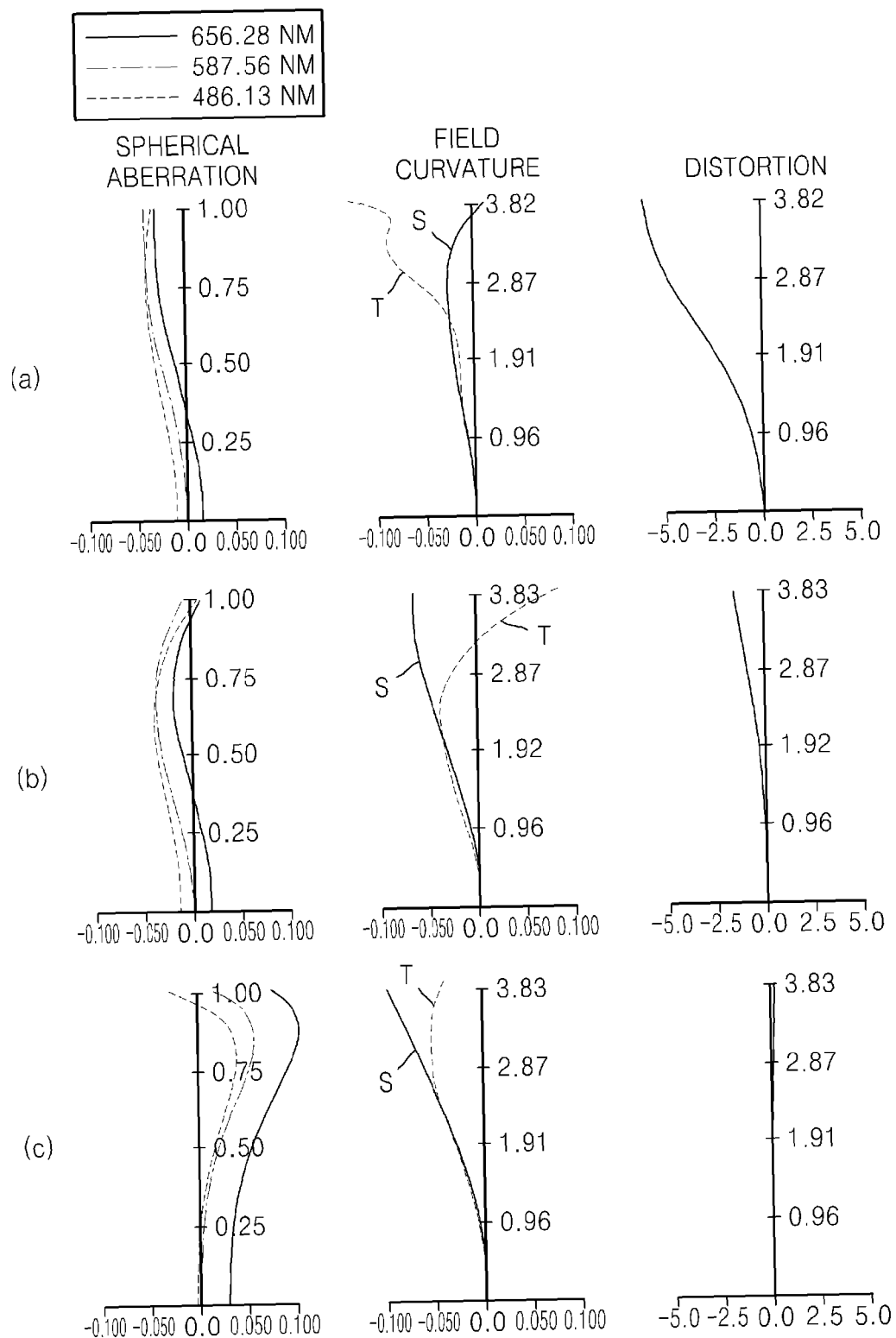
FIG. 6 shows diagrams of spherical aberration, field curvature, and distortion of the zoom lens at wide-angle position, middle-angle position and telephoto position according to another embodiment of the present invention.

FIG. 6 shows diagrams of longitudinal spherical aberration, astigmatic field curvature, and distortion of the zoom lens according to the current embodiment of the present invention at (a) wide-angle position, (b) middle-angle position, and (c) telephoto positions, respectively. The longitudinal spherical aberrations are with respect to a line c having a wavelength of 656.28 nm, a line d having a wavelength of 587.56 nm, and a line f having a wavelength of 486.13 nm. The field curvature includes a tangential field curvature (T) and a sagittal field curvature (S), which are respectively represented by a dotted line and a solid line.

The following table shows that the zoom lenses according to the above embodiments satisfy inequalities 1 to 5.

| | Embodiment 1 | Embodiment 2 | Embodiment 3 |
|---|---|---|---|
| Inequality 1 | −1.149 | −1.147 | −1.173 |
| Inequality 2 | 1.968 | 2.007 | 1.857 |
| Inequality 3 | 4.768 | 4.959 | 4.775 |
| Inequality 4 | −2.094 | −2.100 | −2.081 |
| Inequality 5 | 1.056 | 1.057 | 1.056 |

According to the zoom lens of the embodiments of the present invention, a peripheral illuminance in the entire variation region can be sufficiently ensured, the field curvature can be compensated for efficiently, and the length of the zoom lens can be reduced when the zoom lens is retracted. Accordingly, the compact zoom lens can be fabricated more economically. The above zoom lens can be used in photographing apparatuses such as digital cameras, and thus, an optical apparatus having a small size and high optical performance can be realized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A zoom lens comprising:
   a first lens group having a negative refractive power;
   a second lens group having a positive refractive power; and
   a third lens group having a positive refractive power,
   wherein the first, second, and third lens groups are arranged sequentially from an object side to an image side, and the lens groups are moved during zooming from a wide-angle position to a telephoto position so that the distance between the first lens group and the second lens group is reduced and the distance between the second lens group and the third lens group is changed, and the zoom lens satisfies the following inequalities $$-1.3 < f_1/f_2 < -1.0$$

$$1.6 < f_2/f_w < 2.0$$

$$4.5 < f_3/f_w < 5.2,$$

where, $f_1$, $f_2$, $f_3$ and $f_w$ respectively denote the focal length of the first lens group, the focal length of the second lens group, the focal length of the third lens group, and the overall focal length of the zoom lens at the wide-angle position;

wherein the second lens group includes four lenses that are arranged sequentially from the object side to have positive refractive power, positive refractive power, negative refractive power, and positive refractive power, respectively.

2. The zoom lens of claim 1, wherein the first lens closest to the object side in the second lens group has at least one aspherical surface.

3. The zoom lens of claim 1, wherein the zoom lens satisfies the following inequality $$1.0 < L_t/L_w < 1.2,$$

where $L_t$ and $L_w$ respectively denote lengths of the overall zoom lens at the telephoto position and the wide-angle position.

4. The zoom lens of claim 1, wherein the third lens group includes one positive lens.

5. The zoom lens of claim 4, wherein the positive lens in the third lens group includes at least one aspherical surface.

6. A photographing apparatus comprising:
a zoom lens according to claim 1; and
a charge coupled device receiving an image formed by the zoom lens.

7. The zoom lens of claim 6, wherein the zoom lens satisfies the following inequality:

$$1.0 < L_t/L_w < 1.2,$$

where $L_t$ and $L_w$ respectively denote lengths of the overall zoom lens at the telephoto position and the wide-angle position.

8. A zoom lens comprising:
a first lens group having a negative refractive power;
a second lens group having a positive refractive power; and
a third lens group having a positive refractive power,
wherein the first, second, and third lens groups are arranged sequentially from an object side to an image side, and the lens groups are moved during zooming from a wide-angle position to a telephoto position so that the distance between the first lens group and the second lens group is reduced and the distance between the second lens group and the third lens group is changed, and the zoom lens satisfies the following inequalities $$-1.3 < f_1/f_2 < -1.0$$

$$1.6 < f_2/f_w < 2.0$$

$$4.5 < f_3/f_w < 5.2,$$

where $f_1$, $f_2$, $f_3$ and $f_w$ respectively denote the focal length of the first lens group, the focal length of the second lens group, the focal length of the third lens group, and the overall focal length of the zoom lens at the wide-angle position;

wherein the first lens group includes a meniscus lens that is convex toward the object side and has a negative refractive power, and another lens having a positive refractive power;
wherein the zoom lens satisfies the following inequality $$-2.2 < f_{12}/f_{11} \times \tan(\omega w) < -1.9,$$

where $f_{11}$, $f_{12}$, and $\omega w$ respectively denote the focal length of the negative lens in the first lens group, the focal length of the positive lens in the first lens group, and a half angle of view at the wide-angle position.

9. The zoom lens of claim 8, wherein both surfaces of the meniscus lens having a negative refractive power are aspherical surfaces.

10. The zoom lens of claim 8, wherein the zoom lens satisfies the following inequality:

$$1.0 < L_t/L_w < 1.2,$$

where $L_t$ and $L_w$ respectively denote lengths of the overall zoom lens at the telephoto position and the wide-angle position.

* * * * *